(12) United States Patent
Bando et al.

(10) Patent No.: US 6,405,244 B1
(45) Date of Patent: Jun. 11, 2002

(54) COMMUNICATION APPARATUS FOR RECEIVING DOWNLOADED PROGRAM DATA AND DATA DOWNLOAD METHOD

(75) Inventors: Tatsuo Bando, Musashino; Toshihisa Sawada, Chiba, both of (JP)

(73) Assignee: Matsushita Graphic Communication Systems, Inc., Tokyo (JP)

( * ) Notice: Subject to any disclaimer, the term of this patent is extended or adjusted under 35 U.S.C. 154(b) by 0 days.

(21) Appl. No.: 09/264,821

(22) Filed: Mar. 9, 1999

(30) Foreign Application Priority Data

Jul. 9, 1998 (JP) .......................................... 10-194663

(51) Int. Cl.⁷ .............................................. G06F 13/00
(52) U.S. Cl. ....................................... 709/206; 358/402
(58) Field of Search ................... 707/11, 104; 709/206; 358/452

(56) References Cited

U.S. PATENT DOCUMENTS

| | | | |
|---|---|---|---|
| 5,608,786 A | | 3/1997 | Gordon ...................... 370/352 |
| 5,881,233 A | | 3/1999 | Toyoda et al. .............. 709/233 |
| 5,894,558 A | * | 4/1999 | Falker ......................... 709/239 |
| 6,023,345 A | * | 2/2000 | Bloomfield ................ 358/402 |
| 6,101,244 A | * | 8/2000 | Okada .................. 379/100.08 |
| 6,185,604 B1 | * | 2/2001 | Sekiguchi ................... 709/206 |
| 6,208,996 B1 | * | 3/2001 | Ben-Shachar et al. ...... 707/104 |
| 6,212,550 B1 | * | 4/2001 | Segur ......................... 709/206 |
| 6,253,231 B1 | * | 6/2001 | Fujii ........................... 709/206 |
| 6,266,810 B1 | * | 7/2001 | Tanaka et al. ................ 717/11 |
| 6,275,850 B1 | * | 8/2001 | Beyda et al. ............... 709/206 |

FOREIGN PATENT DOCUMENTS

| | | |
|---|---|---|
| JP | 3154142 | 7/1991 |
| JP | 5150994 | 6/1993 |
| JP | 5233493 | 9/1993 |
| JP | 5265764 | 10/1993 |
| JP | 6164638 | 6/1994 |
| JP | 10-91452 | 4/1998 |

OTHER PUBLICATIONS

An English Language abstract of JP 5–150994.
An English Language abstract of JP 5–265764.
Computational Mail as Network Infrastructure for Computer–Supported Cooperative Work, Nathaniel Borenstein, Conf. Proc. On Computer Supported Cooperative Work, Nov. 1–4, 1992, pp. 67–74, XP002123086.
The Multimedia Fax–MIME Gateway, Sanjiv P. Patel et al., IEEE Multimedia, US, IEEE Computer Society, vol. 1, No. 4, pp. 64–70, XP000484152, ISSN: 1070–986X.
Secure External References in Multimedia Email Message, Burkhard Weigel, ACM Conference on Computer and Communications Security, US., New York, ACM vol. Cof. 3 pp. 11–18, XP000620973, ISBN: 0–89791–829–0.
A System, Architecture for Flexible Control of Downloaded Executed Content, Trent Jaeger, Proc. of 5th International WS on Object–Orientation in Operation Systems, 1996, pp. 14–18, XP0022123002.

* cited by examiner

*Primary Examiner*—N. Le
*Assistant Examiner*—Walter Benson
(74) *Attorney, Agent, or Firm*—Greenblum & Bernstein, P.L.C.

(57) ABSTRACT

A download decision section decides whether or not an electronic mail received by a mail communication section is a DL instruction message indicative of an instruction for downloading a program. A notification/instruction section puts on a light of a lamp when the download instruction message is received, and outputs a download execution instruction when a confirmation button with lamp is pushed down. A DL execution section executes a download of the program according to a download execution instruction. The download execution section generates a download request message to a downloaded data storage server via the mail communication section, and extracts the program from a program attached electronic mail transmitted from the downloaded data storage server. Accordingly, it is possible to make a rewrite of data easier and to process various types of data. The above-mentioned processing thus facilitates a rewrite of data and enables various types of data to be processed.

11 Claims, 16 Drawing Sheets

FIG. 7

```
Received:From IFAX P18.xxxx.yyyy.zzz
Voyager.xxxx.yyyy.zzz.co.jp
   (4.1/16.2)ID AA08132:Thu.26 Mar 98 14:20:25 Jst
Message ID:<9803260520.AA08132@Voyager.xxxx.yyyy.zzz.co.jp>
X-Sender:Pana3@aaa.bbb.co.jp
Date:Thu.26 Mar 1998 14:18:46+0900
To:Name A1 @xxxx.yyyy.zzz.co.jp
From:<Pana3@aaa.bbbj.co.jp>
Subject:!!Download
MIME-Version:1.0
Content-Type:Multipart/Signed:
   Protocol=" Application/X-PKCS7-Signature" :
MICALG=RAS-SHAL:
   Boundary=" =-=-=-=2457256702950l=-=-=-="
X-Mozilla=Status:0001
```
— HEADER SECTION

```
=-=-=-=2457256702950l=-=-=
MIME-Version:1.0
Content-Type:Application/Octet-Stream:Name="Main10.Class"
Content-Transfer-Encoding:base 64
```
(Program/Data)

```
=-=-=-=2457256702950l=-=-=
Content-Type:Application/X-PKCS7-Signature:
   Name=Signature.P7S
Content-Transfer-Encoding:Base 64
```
(Digital Signature)

```
=-=-=-=2457256702950l=-=-=
```

— PROGRAM SECTION
— BODY SECTION

| | 103 |
|---|---|
| CHARACTER | JIS |
| FILE | .doc |
| FILE | .xls |

FIG. 11

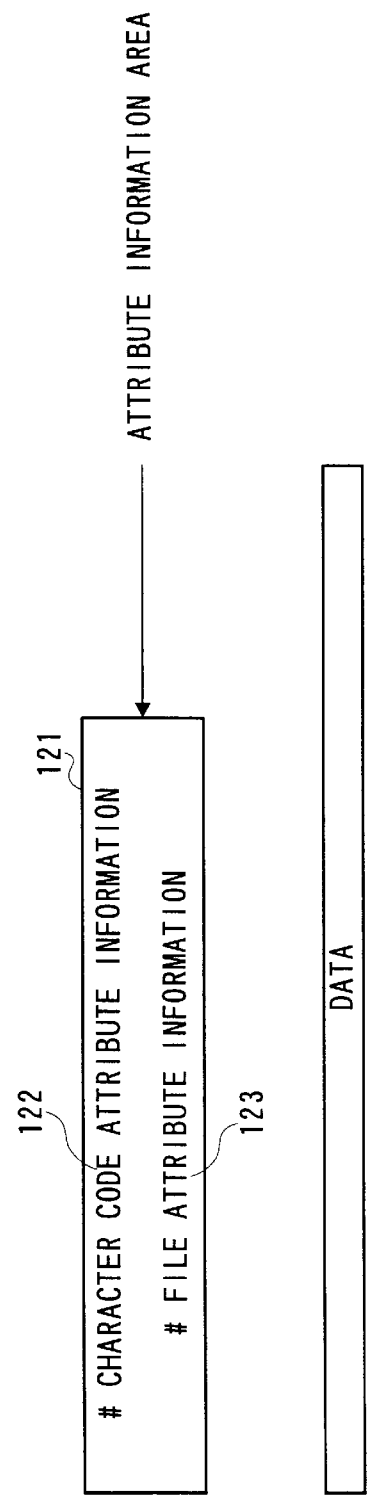

FIG. 12

```
Received:From xxxx.yyyy.zzz.co.jp(MLSV2.xxxx.yyyy.zzz.co.jp)By
        Popml.xxxx.yyyy.zzz.co.jp
        (4.1/16.2)ID AA19545:Thu.29 Jan 98 12:41:16 Jst
Received:From Name03 xxxx.yyyy.zzz.co.jp
        By xxxx.yyyy.zzz.co.jp(SMI-8.6/3.5WP17-97100211)
        With SMTP ID MAA01261:
        Thu.29 Jan 1998 12:45:42+0900
Message-ID:<9801290347 AA00919@Name03 xxxx.yyyy.zzz.co.jp>
From Name02@xxxx.yyyy.zzz.co.jp
Date:Thu.29 Jan 1998 12:47:36+0900
To:Name0101@xxxx.yyyy.zzz.co.jp
Subject:Re !!Download
In=Reply-To<9801200935.AA01204@172.21.93.11.xxxx.yyyy.zzz.co.jp>
MIME-Version: 1.0
X-Mailer:Mailer1.32
Content-Type:Text/Plain:Charset=Iso-2022-Jp
Status:U
```

CHARACTER CODE ATTRIBUTE INFORMATION — 122
FILE ATTRIBUTE INFORMATION — 123

121 — ATTRIBUTE INFORMATION AREA

DATA

| ATTRIBUTE | SERVER ADDRESS (IP) | MAIL ADDRESS |
|---|---|---|
| JIS | 111.222.333.444. | JIS@XXXX.YYYY.ZZZ.CO.JP |
| EUC | 222.222.222.222. | EUC@XXXX.YYYY.ZZZ.CO.JP |
| ISO | 333.333.333.333. | ISO@XXXX.YYYY.ZZZ.CO.JP |
| | | |

| ATTRIBUTE | SERVER ADDRESS (IP) | MAIL ADDRESS |
|---|---|---|
| .PDF | 111.222.333.444. | PDF@XXXX.YYYY.ZZZ.CO.JP |
| .DOC | 222.333.444.555. | DOC@XXXX.YYYY.ZZZ.CO.JP |
| .XLS | 333.444.555.666. | XLS@XXXX.YYYY.ZZZ.CO.JP |

COMMUNICATION APPARATUS FOR RECEIVING DOWNLOADED PROGRAM DATA AND DATA DOWNLOAD METHOD

BACKGROUND OF THE INVENTION

1. Field of the Invention

The present invention relates to a communication apparatus for downloading data, a data rewrite method and a data download method, through a network.

2. Description of the Related Art

A facsimile apparatus for transmitting image data via the internet in the same operation as a general facsimile has been developed. Since the internet is usually used in all or a part of communication path, this type of facsimile is called internet facsimile.

The internet facsimile comprises an electronic mail converting section for mutually converting a format of facsimile data and a format of electronic mail data to transmit and receive. The internet facsimile thereby operates as follows:

The internet facsimile at a transmitting side converts facsimile data into the format of electronic mail to transmit. The internet facsimile at a receiving side converts inversely a received electronic mail into a format of image data, and then prints the image data in the same way as facsimile data received by ordinary facsimile communication.

However, the technology concerning the internet has been improved very fast. As a result, a communication program, image processing program and others comprised in the internet facsimile become old easily. The frequency to upgrade a version of the program in the internet facsimile is thereby higher than the ordinary facsimile. In the ordinary facsimile, since the program is memorized in a ROM (Read Only Memory), it is necessary to exchange the ROM to upgrade a version, thereby remaining a problem that it takes much time and labor. This problem is not limited by the internet facsimile but common to so called network home electric appliances such as a telephone, a television, and a refrigerator that comprise network communication function.

On the other hand, the internet facsimile receives the electronic mail and converts it into image data to print, as described above. However, in the case where a character code used in the electronic mail does not correspond, or a data file that can not be extended, such as a document by word processor or a spread sheet is attached, the internet facsimile can not perform a normal printing. It is necessary to prepare a lot of conversion programs and conversion tables in order to correspond to all character codes and data files. However, since the internet facsimile does not usually have a second memory device with a large memory capacity such as a hard disk, it is difficult for the internet facsimile to correspond to all character codes and data files.

SUMMARY OF THE INVENTION

The first object of the present invention is to provide a communication apparatus for enabling an easy data rewrite and the processing of various data.

The second object of the present invention is to provide a data rewrite method for enabling an easy data rewrite and the processing of various data.

The third object of the present invention is to provide a data download method for enabling an easy data write and the processing of various data.

The present invention provides a communication apparatus for receiving an electronic mail, which comprises a mail reception section for receiving an electronic mail via a network, a program data extraction section for extracting program data from the electronic mail, and a data storage section for storing the extracted data.

The present invention provides a communication apparatus for receiving an electronic mail, which comprises a data storage section for storing program data, a mail reception section for receiving an electronic mail via a network, a program data extraction section for extracting the program data from the electronic mail, and a data rewrite section for rewriting the program data stored in the data storage section using the extracted program data.

The present invention provides a communication apparatus for receiving an electronic mail, which comprises a mail reception section for receiving an electronic mail via a network, and a download section for executing a download of data when the electronic mail is a download instruction message for instructing a download of the data.

The present invention provides a communication apparatus for receiving an electronic mail, which comprises a mail reception section for receiving an electronic mail via a network, a notification section for notifying of a reception of the electronic mail when the electronic mail is a download instruction message for instructing a download of data, a download section for executing a download of the data, and an input section which is used to instruct a download to the download section from an outside.

The present invention provides a communication apparatus for receiving an electronic mail, which comprises a mail reception section for receiving an electronic mail via a network, a decision section for deciding whether or not it is possible to process data in the electronic mail, and a download section for downloading data that is necessary to process the data in the electronic mail from a server when the decision section decides that it is not possible to process the data in the electronic mail.

The present invention provides a communication apparatus for transmitting and receiving an electronic mail, which comprises a mail reception section for receiving an electronic mail via a network, a decision section for deciding whether or not it is possible to process data in the electronic mail, and a data forward section for forwarding the data to a processing server when the decision section decides that it is not possible to process the data.

The present invention provides a method for downloading data, which comprises the steps of extracting program data from an received electronic mail, and storing the extracted program data.

The present invention provides a method for rewriting data, which comprises the steps of extracting program data from an received electronic mail, and rewriting current data using the extracted program data.

The present invention provides a method for downloading data, which comprises the steps of deciding whether or not a received electronic mail is a download instruction message for instructing a download of data, and downloading the data when it is decided that the mail is the download instruction message.

The present invention provides a method for downloading data, which comprises the steps of notifying of a reception of an electronic mail when the received electronic mail is a download instruction message for instructing a download of data, and downloading the data when an instruction is performed from an outside after the reception is notified.

The present invention provides a method for downloading data, which comprises the steps of deciding whether or not it is possible to process data in a received electronic mail, and downloading data that is necessary to process the data in the electronic mail from a server when it is decided that it is not possible to process the data in the electronic mail.

The present invention provides a method for processing data, which comprises the steps of deciding whether or not it is possible to process data in a received electronic mail, and forwarding the data to a processing server when it is decided that it is not possible to process the data.

BRIEF DESCRIPTION OF THE DRAWINGS

The above and other objects and features of the invention will appear more fully hereinafter from a consideration of the following description taken in connection with the accompanying drawing wherein one example is illustrated by way of example.

FIG. 7 is a diagram illustrating an example of a download instruction message used in the internet facsimile apparatus according to the above first embodiment;

FIG. 11 is a diagram illustrating an attribute table in the second and third embodiments of the present invention;

FIG. 12 is a diagram illustrating an example of an electronic mail in the second and third embodiments of the present invention;

FIG. 13 is a diagram illustrating an example of a server table used in the above second embodiment;

FIG. 16 is a diagram illustrating an example of a server table used in the above third embodiment.

DETAILED DESCRIPTION OF THE PREFERRED EMBODIMENTS

The embodiments of the present invention are explained in detail in the following with reference to drawings.

Figure 1:
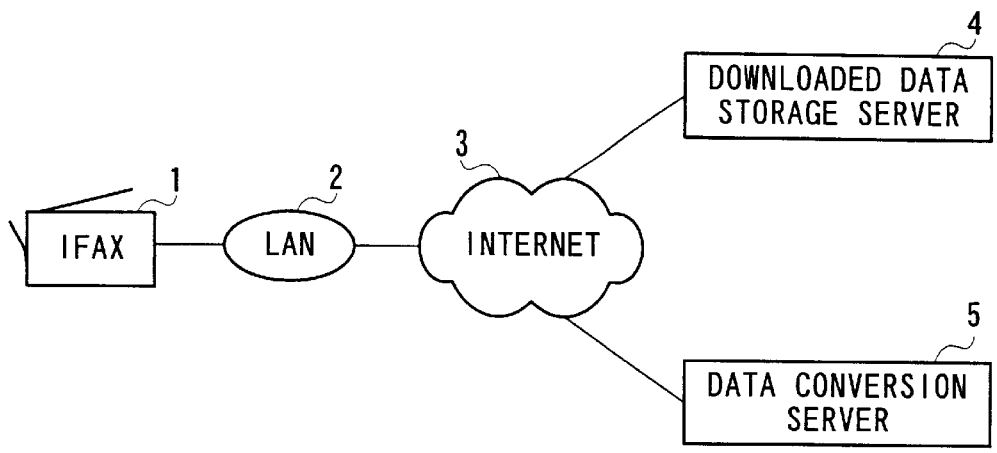
FIG. 1 is a conceptual diagram illustrating a network in which internet facsimile apparatuses according to the first embodiment to the third embodiment of the present invention operate.

FIG. 1 is a conceptual diagram illustrating a network in which internet facsimile apparatuses according to the first embodiment to the third embodiment of the present invention operate. An internet facsimile apparatus (hereinafter referred to as IFAX) 1 is connected to the internet 3 via a LAN (Local Area Network) 2. In this example, the LAN 2 is constructed of an Ethernet, however it may be a wireless LAN or others. In the internet 3, there are a downloaded data storage server 4 and a data conversion server 5.

(First embodiment)

Figure 2:
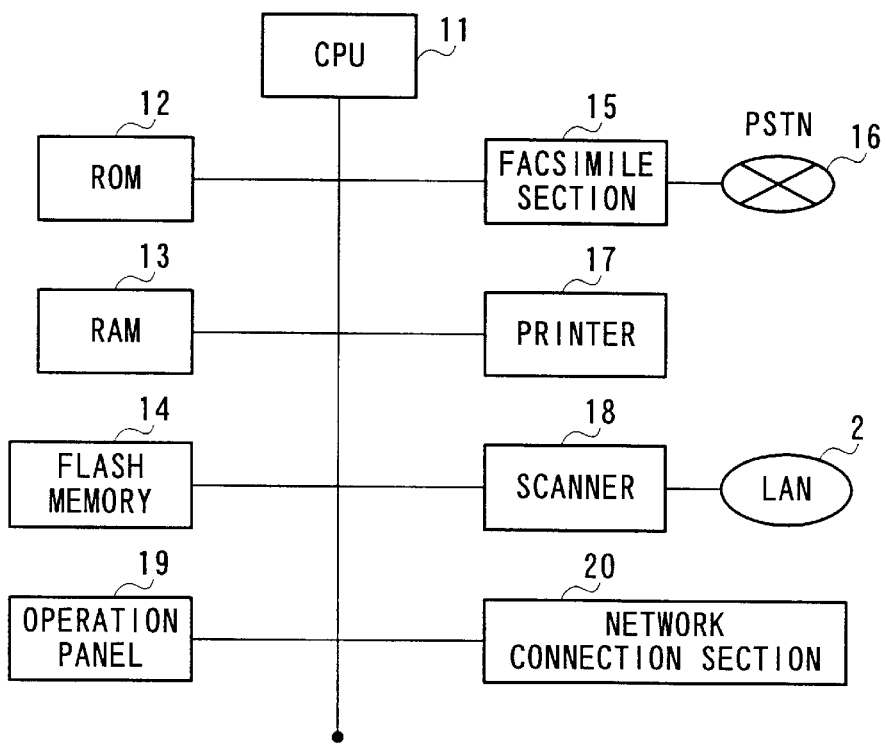
FIG. 2 is a block diagram illustrating a hardware configuration of the internet facsimile apparatus according to the first embodiment of the present invention.

FIG. 2 is a block diagram illustrating a hardware configuration of the internet facsimile apparatus according to the first embodiment of the present invention.

A CPU 11 executes various programs to control each section of the IFAX 1. A ROM 12 is used to store a basic program such as an operations system (OS) executed by the CPU 11 that is, for example, Java (Registered Trade-mark) OS. A RAM 13 is used for a data area of a program, while used as an image memory to store facsimile data.

A flash memory 14 is to store a communication program, an image processing program and others that are executed by the CPU 11 and used in order to enable the programs to be rewritten. As this memory means, a nonvolatile semiconductor memory such as an EEPROM (Electric Erasable Programmable Read Only Memory) or a volatile semiconductor memory such as a SRAM (Static Random Access Memory) with a backup battery may be used other than the flash memory.

A facsimile section 15 performs a communication with an external facsimile via a PSTN 16 according to a facsimile communication procedure. The facsimile section 15 includes ,for example, a modem for executing modulation and demodulation, an image compression section for compressing image data and an image extension section for extending image data.

A printer 17 outputs data with printing. A scanner 18 performs scanning of an original.

Figure 3:
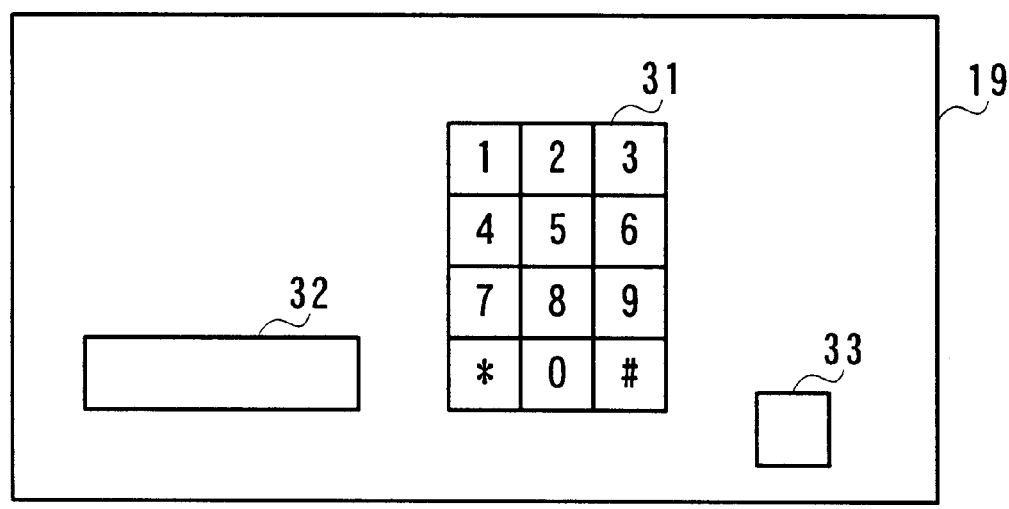
FIG. 3 is a plan view illustrating an operation panel of the internet facsimile apparatus according to the above first embodiment.

An operation panel 19 is used for a user to perform various operations of the IFAX 1, while indicates various information to a user. FIG. 3 is a plan view illustrating an operation panel of the internet facsimile apparatus according to the first embodiment. The operation panel 19 comprises a ten-key 31 to, for example, dial, and an indication section 32 composed of, for example, a liquid crystal display (LCD). Further, a confirmation button with lamp 33 is independently provided on the operation panel 19.

A network connection section 20 is an interface to control transmission and reception of data with the LAN 2.

A bus 22 is a path via which data are transferred between the CPU 11, the ROM 12, the RAM 13, the flash memory 14, the facsimile section 15, the printer 17, the scanner 18, the operation panel 19 and the network connection section 20.

Figure 4:
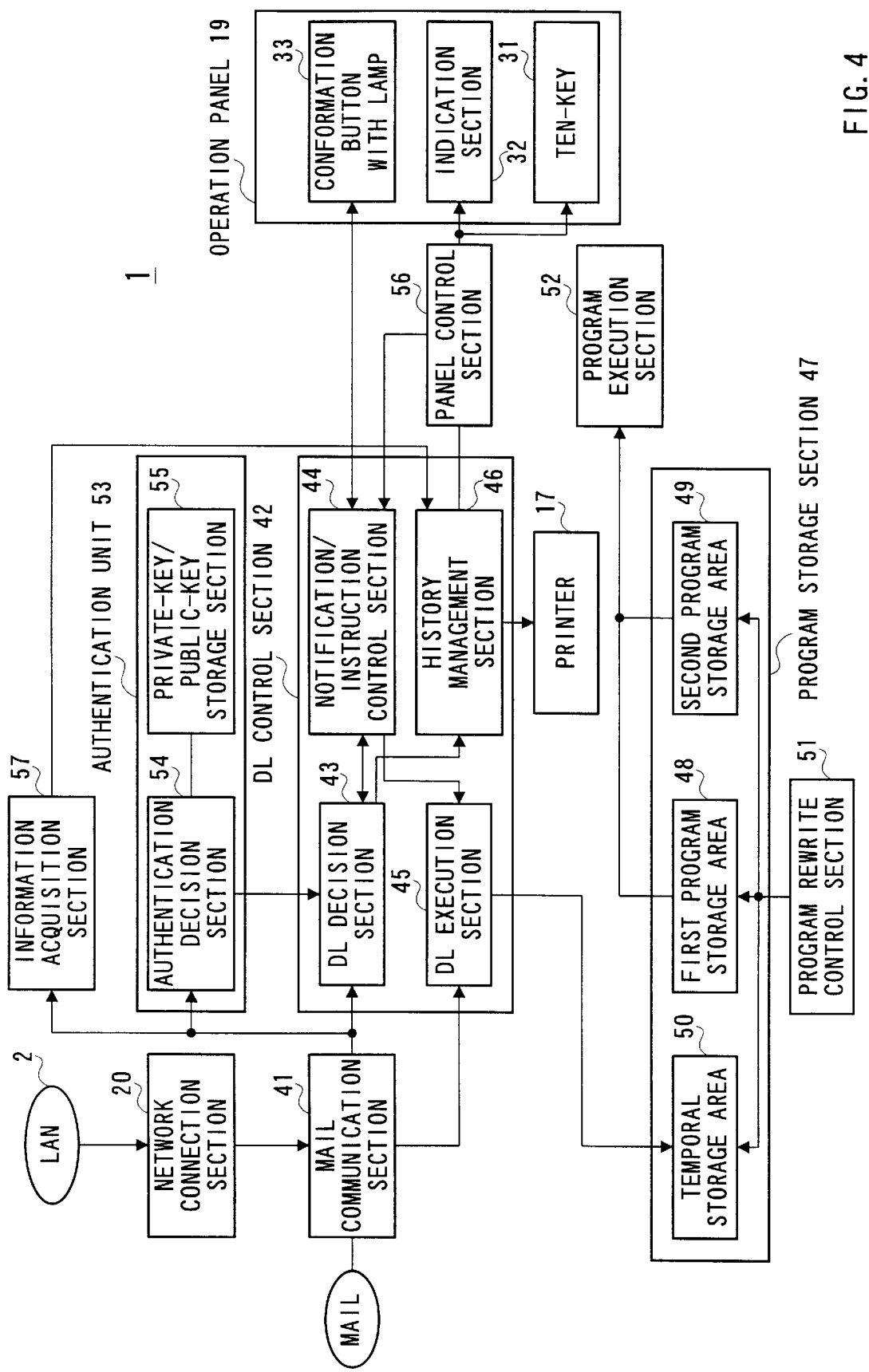
FIG. 4 is a function block diagram illustrating the internet facsimile apparatus according to the above first embodiment.

FIG. 4 is a function block diagram illustrating the internet facsimile apparatus according to the first embodiment.

A mail communication section 41 transmits and receives an electronic mail via the network connection section 20. The mail communication section 41 transmits and receives an electronic mail according to a message transfer protocol such as, for example, SMTP (Simple Mail Transfer Protocol) and POP (Post Office Protocol).

A download (DL) control unit 42 comprises a DL decision section 43, a notification/instruction control section 44, a DL execution section 45 and a history management section 46.

The DL decision section 43 decides whether or not an message received by the mail communication section 41 indicates an instruction of a download of a program (hereinafter referred to as DL instruction message).

The notification/instruction control section 44 is connected to the DL decision section 41. The notification/instruction control section 44 turns on or off a lamp of the confirmation button with lamp 33 according to a decision of the DL decision section 41. Specifically, the notification/instruction control section 44 puts on a light of the lamp when the mail communication section 41 receives the DL instruction message. Further, the notification/instruction control section 44 outputs a DL execution command when the confirmation button with lamp 33 is pushed down.

The DL execution section 45 executes a download of a program according to the DL execution command from the notification/instruction control section 44. The DL execution section 45 generates a message requesting the downloaded data storage 4 to transmit a program to this IFAX 1 (hereinafter referred to as DL request message). The mail communication section 41 transmits the DL request message to the downloaded data storage server 4 illustrated in FIG. 1. In addition, the DL execution section 45 extracts the program from an electronic mail to which the program is attached (hereinafter referred to as program attached mail) transmitted from the downloaded data storage server 4. As a result, the program is downloaded from the downloaded data storage saver 4.

The history management section 46 is connected to the DL decision section 41 and holds various information contained in the DL instruction message. In addition, the history management section 46 indicates the held information in the indication section 32 and prints it in the printer 17.

A program storage section 47 is provided in the flash memory 14 illustrated in FIG. 2, and composed of a plurality of storage areas including a first program storage area 48, a second program storage area 49 and a temporal storage area 50. The downloaded program is stored alternately in the first program storage area 48 and the second program storage area 49. The downloaded program is also temporally stored in the temporal storage area 50. A program rewrite control section 51 executes interpreter processing of the program stored in the temporal storage area 50, and stores the program in the first program storage area 48 or the second program storage area 49 when the program is normally interpreted. According to the forgoing constitution, since a used program is not erased soon, it is possible to use an old program when a new program has a bug. The number of program storage areas is not limited by two, and may be more than two.

A program execution section 52 reads out a program from the first program storage area 48 or the second program storage area 49 to execute.

An authentication unit 53 performs authentication with a transmission side or a reception side in transmitting and receiving an electronic mail. In this example, a public-key cryptography is used. The authentication unit 53 is composed of an authentication decision section 54 and a private-key/public-key storage section 55. The private-key/public-key storage section 55 stores a private-key that is confidential for each individual and a public-key that is opened to the public. In transmitting, the authentication decision section 54 compresses a document with one-way function to cypher with the private key so as to generate a digital signature, and attaches the digital signature to an electronic mail along with the original document. Further, in receiving, the authentication decision section 54 decodes a digital signature attached to an electronic mail using the public-key to compare with a digital signature generated from an original document by the section for itself 54 using the one-way function, and when those digital signatures coincides, decides that falsification or alternation is not performed.

A panel control section 56 controls an input by the ten-key 31 provided on the operation panel 19 and an indication by the indication section 32.

An information acquisition section 57 acquires program information such as a name, a type, a version, date, a file name of a program included in an electronic mail such as a DL instruction message. In addition, the information acquisition section 57 transmits the acquired information to the history management section 46 in order to enable the section 46 to store it with presence or absence, date, execution person name and others of a download. The history management section 46 indicates or prints the program information in a list form in the indication section 32 or in the printer 17 respectively. The print of the list can be performed by an instruction of an operator or automatically at predetermined intervals.

Figure 5:
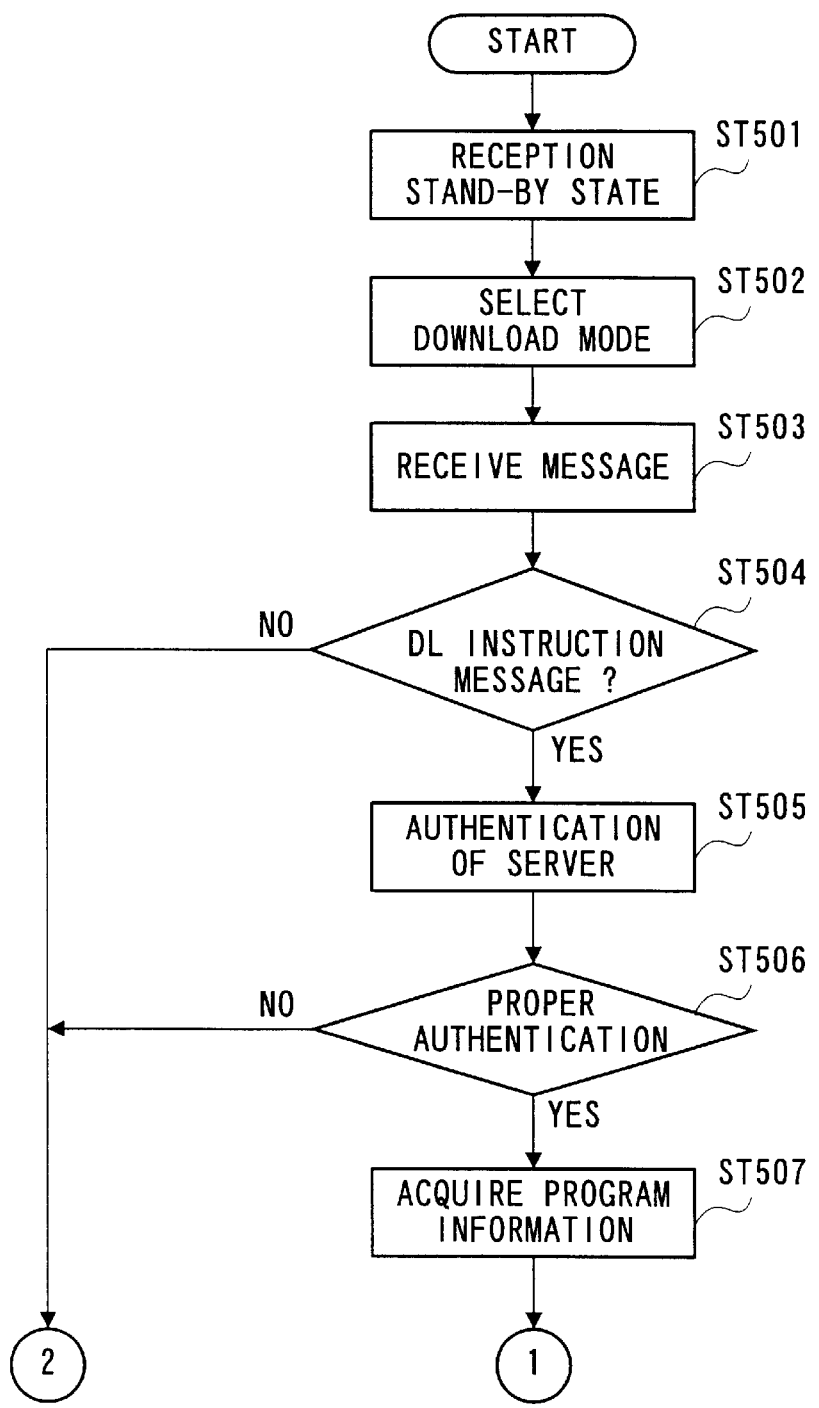
FIG. 5 is a flow diagram illustrating operations of the internet facsimile apparatus according to the above first embodiment.
Figure 6:
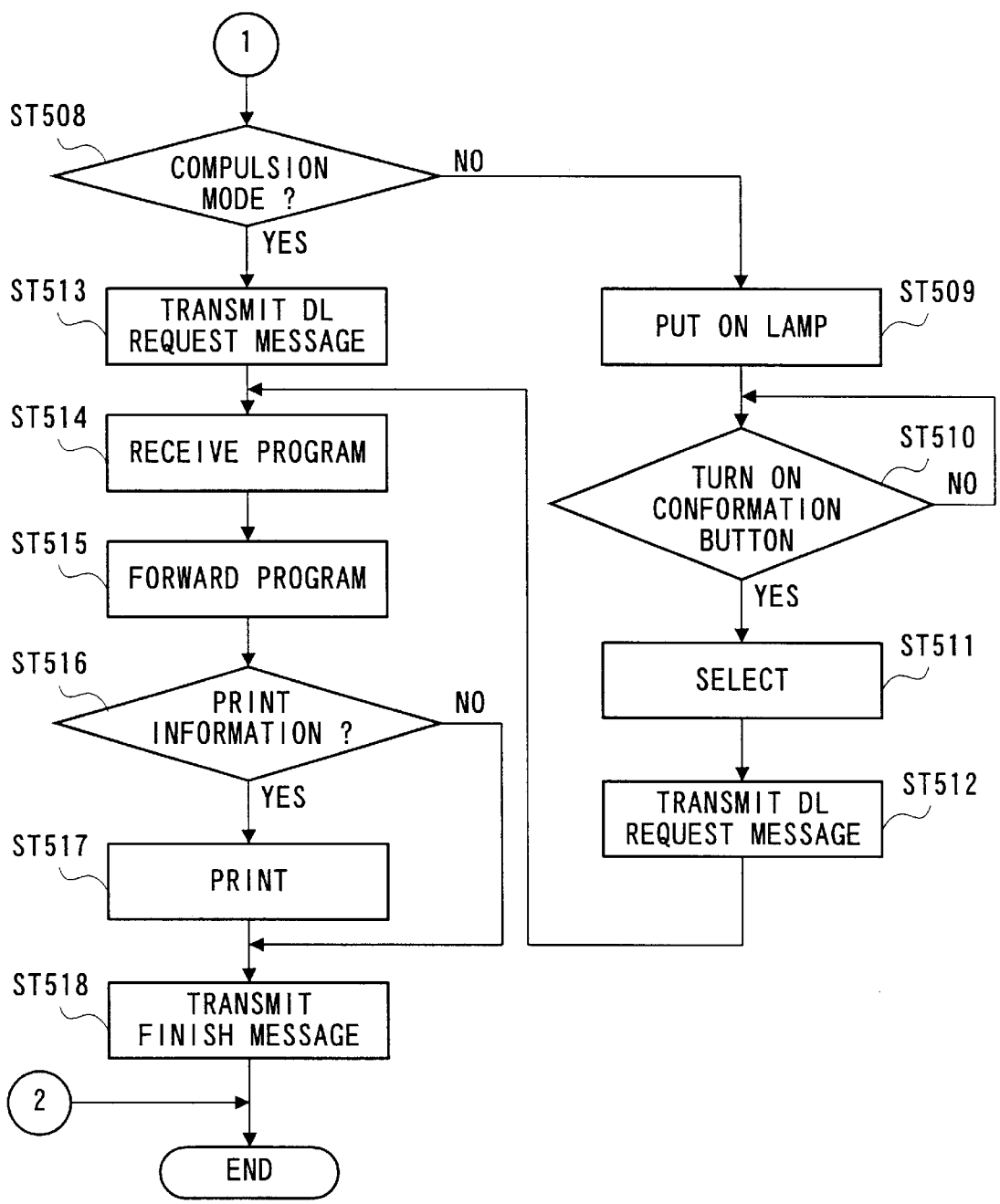
FIG. 6 is a flow diagram illustrating operations of the internet facsimile apparatus according to the above first embodiment.

Operations of the IFAX 1 according to this embodiment configured as described above are explained. FIGS. 5 and 6 are flow diagrams illustrating operations of the IFAX 1 according to the first embodiment.

In step (hereinafter abbreviated as ST) 501, the IFAX 1 enters a reception stand-by state.

In ST502, an operator selects either of a compulsion mode or a confirmation mode (hereinafter described as download mode) of the DL decision section 43. The DL decision section 43 usually is in the confirmation mode. At this point, a light is put off in the confirmation button with lamp 33. When an operator desires the compulsion mode, the operator pushes down the confirmation button with lamp 33. By this operation, the notification/instruction control section 44 instructs the DL decision section 43 to shift to the compulsion mode. On the other hand, the light is put on in the confirmation button with lamp 33 in order to notify the operator of the compulsion mode.

In ST504, the mail communication section 42 receives a message. The DL decision section 43 decides whether or not the message is a DL instruction message. The decision is performed by detecting that a code sequence or symbols indicating a DL instruction are contained in the electronic mail. FIG. 7 is a diagram illustrating an example of the DL instruction message used in the IFAX 1 according to the first embodiment. As illustrated in FIG. 7, the DL instruction message conforms to MIME (Multipurpose Internet Mail Extensions). Note that a subject of a header section of the DL instruction message is "!!download". In this case, the DL decision section 43 decides that the message is the DL instruction message when detects that the subject is "!!download".

At this point, when the message is not the DL instruction message, the message is processed as a normal electronic mail. On the other hand, when the message is the DL instruction message, the authentication unit 53 executes authentication of a server in ST505. Specifically, the downloaded data storage server 4 illustrated in FIG. 1 as a tranmistter attaches the digital signature in a program section of an electronic mail in the DL instruction message as illustrated in FIG. 7. The digital signature is obtained by cypering a digest of message, which is generated from the program section with the one-way function, using the public-key of the IFAX 1. The authentication decision section 54 decodes the digital signature using the individual private-key stored in the private-key/public-key storage section 55, compares the decoded digest of message with the digest of message processed with the one-way function from the program section for itself, and confirms it when these digests coincident. An authentication method is not limited by the public-key cryptography method.

In ST506, the authentication unit 53 decides whether or not the authentication is proper. When the authentication is improper, the processing is finished. On the other hand, the authentication is proper, in ST507, the information acquisition section 57 acquires program information from the DL instruction message to memory.

In ST508, the DL control section 42 decides whether or not the download mode is the compulsion mode. When it is not the compulsion mode, in ST509, the notification/instruction control section 44 puts on a light in the confirmation button with lamp 33 to notify of the DL instruction.

In ST510, the notification/instruction control section 44 stands by until an operator pushes down the confirmation button with lamp 33. When the notification/instruction control section 44 detects the push down of the confirmation button with lamp 33, the processing moves to ST511.

In ST511, the IFAX 1 requires the operator to select a version. The history management section 46 transmits program information about programs of old versions that are not downloaded to the panel control section 56. The panel control section 56 indicates the program information in the indication section 32 in the list form or to print in the printer 27 in the list form. The operator refers to the program information to select any version, for example, with the ten-key 31. The selection result is transmitted to the notification/instruction control section 44 via the ten-key 31 and the panel control section 56. The notification/instruction control section 44 designates a version to output the DL execution instruction to the DL execution section 45.

Figure 8:
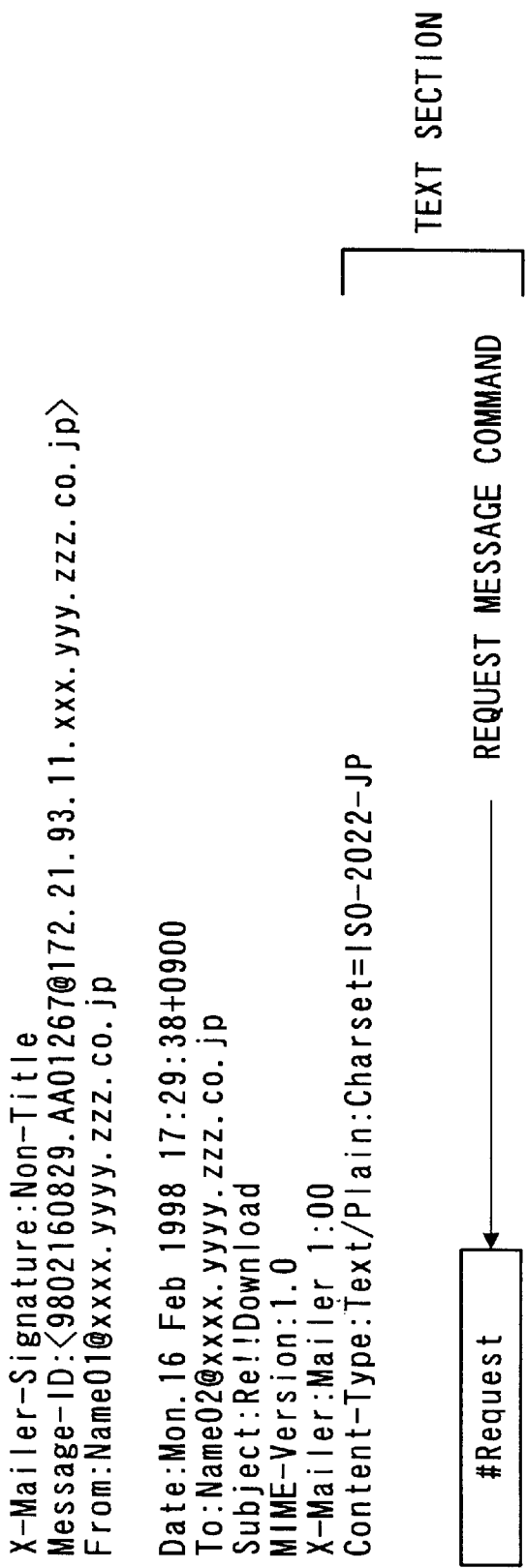
FIG. 8 is a diagram illustrating an example of a download request message according to the above first embodiment.

In ST512, the DL execution section 45 generates the DL request message to transmit to the downloaded data storage server 4 via the mail communication section 41. FIG. 8 is a diagram illustrating an example of a DL request message according to the first embodiment. As illustrated in FIG. 8, the DL request message includes a request message command composed of a character sequence and/or symbols such as, for example, "#request" in a text section. The request message command may be added a command designated the selected version in the ST511.

On the other hand, when the download mode is the compulsion mode in ST508, in ST513, the DL execution section 45 generates the DL request message without a designation of a version to transmit to the downloaded data storage 4 server via the mail communication section 41.

In ST514, the IFAX 1 receives a program. Specifically, the mail communication section 41 receives a program attached mail from the downloaded data storage server 4. The program attached mail includes print request information indicative of whether or not to print the program information such as a version. In addition, program data are encoded to ASCII code in a code form such as, for example, base64. The DL execution section 44 decodes the program data, and then temporally stores the data in the temporal storage area 50 in the program storage section 47.

In ST515, the program rewrite control section 51 transfers the downloaded program from the temporal storage area to either of the first storage area 48 or the second storage area 49. As a result, the old program are overwritten by the new program.

In ST516, the history management section 46 decides whether or not a print is requested according to the print request information included in the program attached mail. When the print is requested, in ST517, the history management section 46 instructs the printer 17 to print the program information. When the print is not requested, the processing moves to ST518 by passing ST518.

In ST518, the DL execution section 44 transmits a DL finish message to a sender of the DL instruction message or the program attached mail to finish the processing.

Next, operations of the downloaded data storage server are explained.

Figure 9:
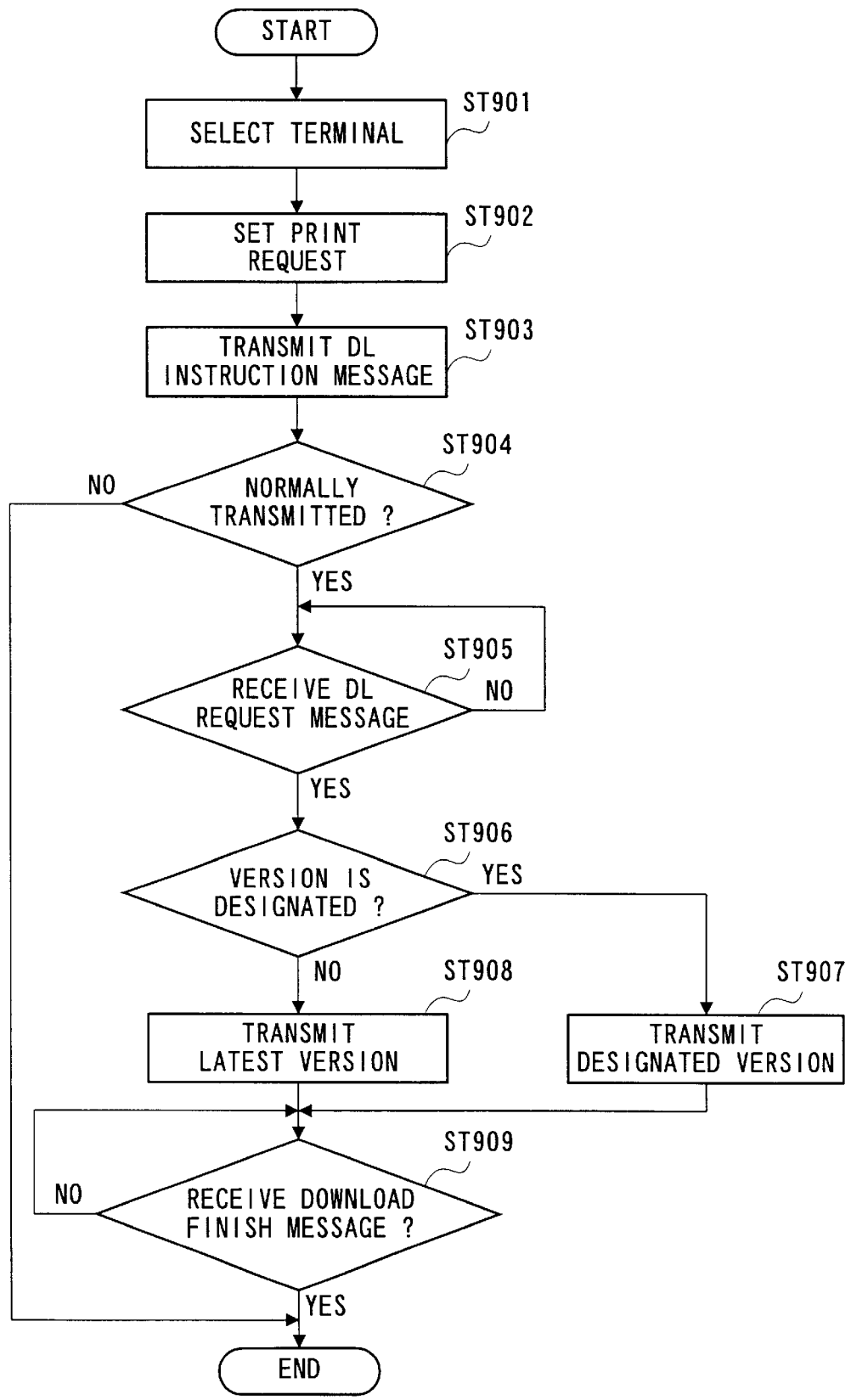
FIG. 9 is a flow diagram illustrating operations of a downloaded data storage server in the above first embodiment.

FIG. 9 is a flow diagram illustrating operations of the downloaded data storage server in the first embodiment.

In ST901, the downloaded data storage server 4 (hereinafter referred to as server 4) selects the IFAX 1 for executing a download of a program of a new version according to a setting of an operator or others.

In ST902, the server 4 sets a print request. The print request is a setting of whether or not to print the program information in the IFAX 1 as described previously.

In ST903, the server 4 transmits the DL instruction message. In ST904, it is decided whether or not the DL instruction message was normally transmitted. When it was transmitted normally, the server 4 awaits the DL request message from the IFAX 1 in ST905.

When the server 4 receives the DL request message, it is decided whether or not the DL request message includes a designation of a version in ST906. When the designation is included, the server 4 transmits program data of the designated version in ST907. On the other hand, when the designation is not included, the server 4 transmits program data of the latest version in ST908.

In ST909, the server 4 awaits the DL finish message, and finishes the processing when receives the DL finish message.

According to the IFAX 1 in the first embodiment described above, when the program attached mail is received, the DL execution section 45 extracts a program to store in the program storage section 47, and the program rewrite control section 51 rewrite an old program. Therefore, it is not necessary for an operator to perform a series of operations for rewriting a program such as accessing the downloaded data storage server 4 and downloading the program to rewrite an old program. As a result, it makes possible to upgrade a program very easily.

In addition, the DL decision section 44 decides whether or not a received electronic mail is a DL instruction message, and automatically shifts to the download processing when it is the DL request message. Therefore, it is not necessary for an operator to perform a series of operations such as receiving a DL instruction by electronic mail and reading it to access a designated server.

Of course, when a program is not stored yet in the first program storage area 48 or the second program storage area 49, it is possible to download the program newly from the loaded data storage server 4 by electronic mail to store. Even in this case, it is not necessary for an operator to perform a set of complicated operations, thus enabling the operator to execute the download very easily.

In addition, since the DL execution section 45 transmits the DL request message to the downloaded data storage server 4 in order to enable the server 4 to transmit the program attached mail, it is possible to execute the download of the program by electronic mail. Therefore, it is possible to execute an upgrade of the program even though a program transfer is limited by a firewall provided between the LAN 2 and the internet 3.

In addition, in the confirmation mode, since an operator is notified of reception of a DL instruction message by the confirmation button with lamp 33, it is possible for the operator to know easily that the DL instruction is received. Next, the download of the program is executed by an operator pushing down the confirmation button with lamp 33. It is thereby possible to confirm an operator's intention of whether to perform the upgrade of the program, thus making it possible to prevent the program to be downloaded not depending on the operator's intention.

In the compulsion mode, the download is executed automatically according to the DL instruction message to enable the upgrade of the program.

Further, since an operator can select the compulsion mode or the confirmation mode by pushing down the confirmation button with lamp 33 during standing by, the operator can select optionally whether to perform the upgrade automatically without confirmation or to perform the upgrade after confirmation.

In addition, since the history management section 46 holds the program information such as version information of a program and indicates or prints it in the indication section 32 or the printer 17 respectively, it is possible for an operator to easily understand a type of a new program, a previous upgrade result and others.

In the confirmation mode, the history management section 46 indicates or prints an old version that is not downloaded from among the held program information, then an arbitrary version of a program that is selected by an operator is downloaded. Therefore it is possible to upgrade the program to a necessary version by an operator's intention.

The download is executed only after the authentication unit 53 performs authentication and it is confirmed that a DL request message is transmitted from a transmission side, thereby making it possible to prevent a program from being rewritten improperly by the download executed by an improper electronic mail.

The above first embodiment describes about the case where a program is downloaded to upgrade a version. However, an object to be downloaded may be data other than programs such as, for example, a conversion table and the other.

In addition, in the above first embodiment, an arbitrary version is designated with a list in which various versions of the same program are indicated in the confirmation mode. However, it may be possible to designate arbitrary data with a list in which various data are indicated.

In addition, it may be possible to use a lamp having a plurality of color lights as the confirmation button with lamp 33 in this case, puts the lamp on a different light depending on a type of an object to be downloaded based on information included in the DL instruction message. Therefore, it is possible to indicate, for example, a program or a conversion table, or download of a basic program such as application software and utility software or an optional program to distinguish in downloading. Further, it may be possible to indicate a program that should be downloaded or a program that is downloaded optionally. It is thereby possible for an operator to know the type of the object to be downloaded easily, decides whether or not the download is appropriated and performs the download by pushing down the confirmation button with lamp 33.

It may be possible to use other indication means or input means such as a confirmation button icon provided in a tough panel display instead of the confirmation button with lamp 33. Further, it is may be possible to use other notification means with sound, voice or the like other than the indication means. In any means, by providing a button exclusive used for a download, an operator can execute a download only by pushing down the button. The download is thereby executed more easily than the case of using a PC (Personal Computer).

In addition, in the above first embodiment, a download of a program is not executed until a DL request message is brought. However, in the case where the flash memory 14 of the IFAX 1 has a large memory capacity, it may be possible that a transmission side transmits a program attached mail to the IFAX 1, the IFAX 1 receives all data to store in the temporal storage area 50, asks an operator whether or not it is necessary to rewrite the program, and when the operator instructs the rewrite, instructs the program rewrite control section 51 to rewrite the program in the first program storage area 48 or the second program storage area 49.

(Second embodiment)

Next an internet facsimile apparatus for converting received electronic mail data is explained.

Figure 10:
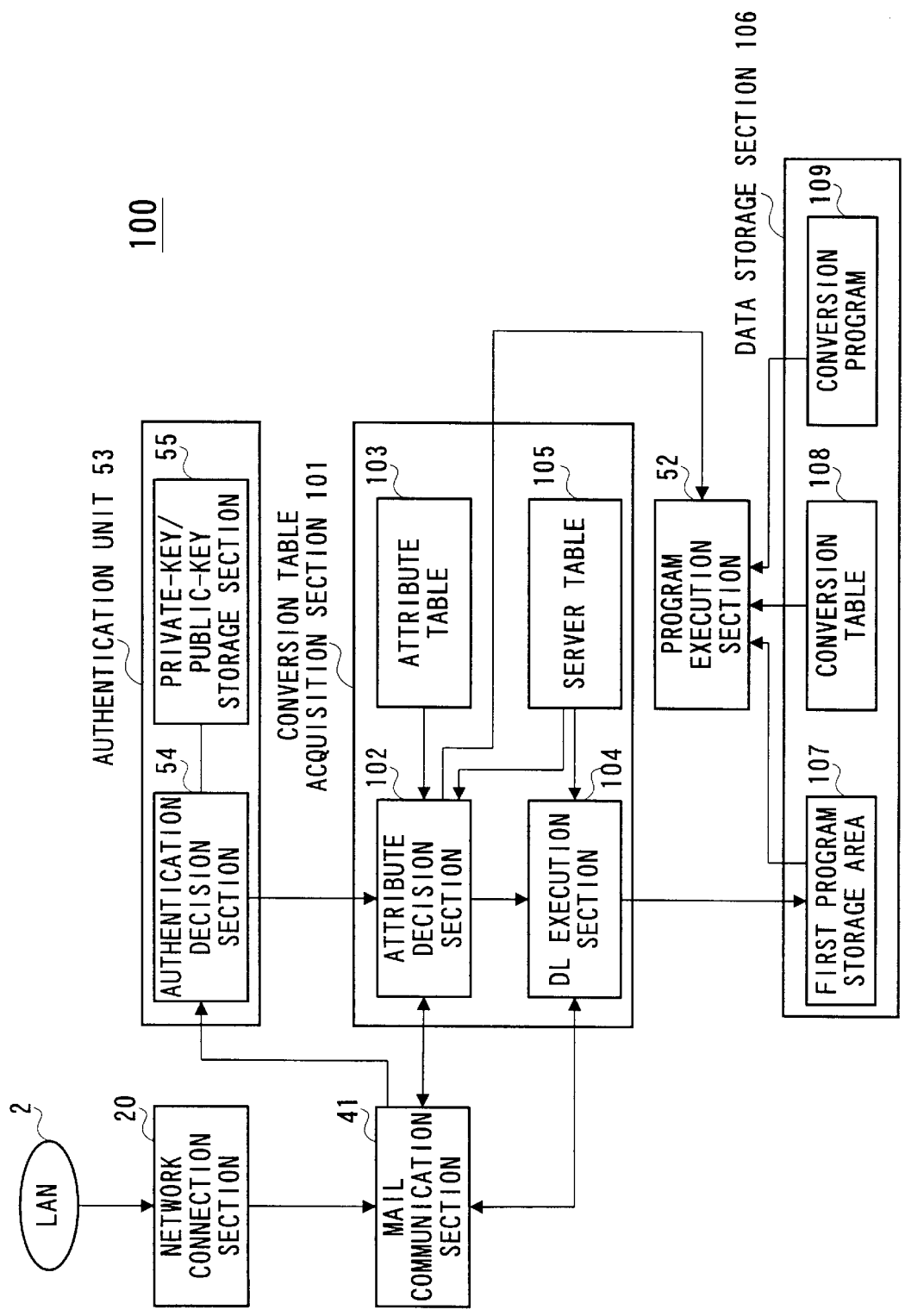
FIG. 10 is a function block diagram illustrating the internet facsimile apparatus according to the second embodiment of the present invention.

FIG. 10 is a function block diagram illustrating the internet facsimile apparatus according to the second embodiment of the present invention. The same configurations as the first embodiment have the same symbols to omit the explanation.

Figure 11:
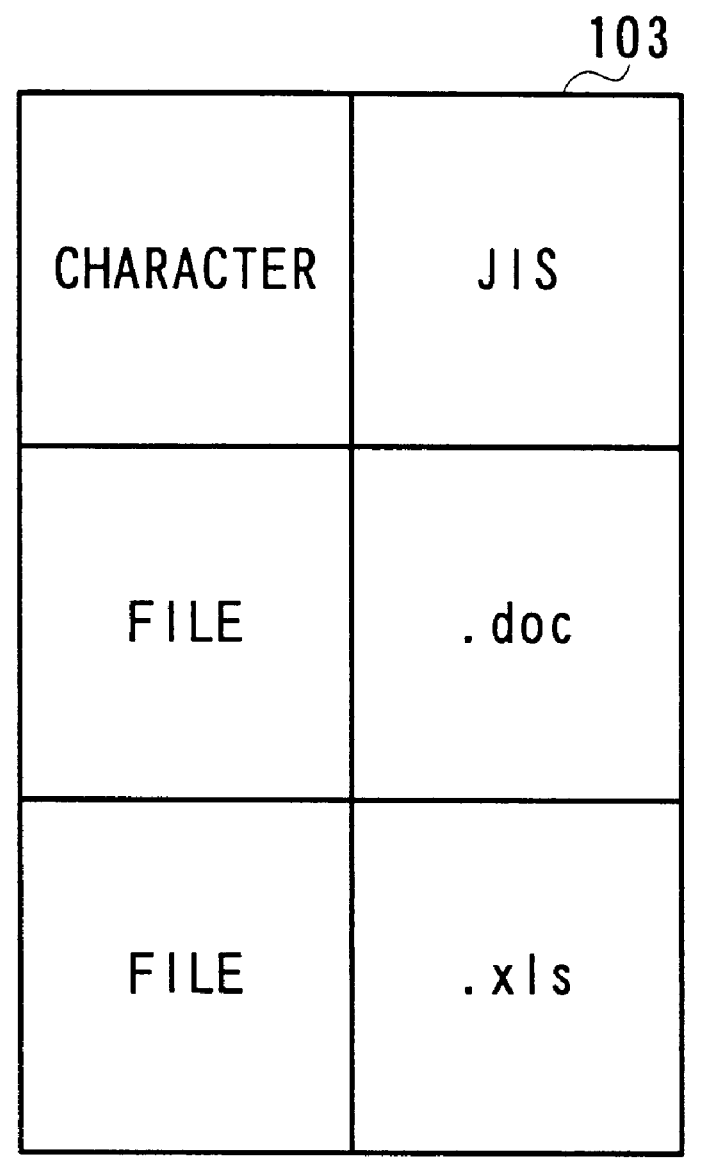

A conversion table acquisition section 101 is composed of an attribute decision section 102, an attribute table 103, a DL execution section 104 and a server table 105. The attribute decision section 101 decides whether or not it is possible to convert a text character code in electronic mail data received by the mail communication section 41 to print. As illustrated in FIG. 11, the attribute that is convertable in standard is registered in the attribute table 103. In this example, a character code conforms to a JIS code in standard.

The attribute decision section 102 obtains the attribute of electronic mail data using attribute information described in the electronic mail. As illustrated in FIG. 12, an attribute information area 121 is provided in an electronic mail. The attribute information area 121 includes character code attribute information 122 and file attribute information 123.

When it is decided that it is possible to convert the attribute of the electronic mail, the attribute decision section 102 instructs the program execution section 52 to execute the conversion. On the other hand, when it is not possible to convert, the attribute decision section 102 instructs the DL execution section 104 to download the conversion table.

When a character code of the electronic mail data is not present in the attribute table 102, the DL execution section 104 accesses the downloaded data storage server 4 to download the conversion table. The download of the conversion table is executed according to the procedure where the DL execution section 104 transmits the DL request message to downloaded data storage server 4, the downloaded data storage server 4 transmits an electronic mail to which the conversion table is attached (hereinafter referred to as data-attached mail) to the DL execution section 104. The DL execution section 104 extracts the conversion table from the received data-attached mail.

In the server table 105, a type of data, an IP address and a mail address of a server having the conversion table for the data are set in correlation with each other. FIG. 13 is a diagram illustrating an example of a server table used in the second embodiment. Each IP address and each mail address of a server having a conversion table is set corresponding to each character code such as, JIS code (JIS), expand UNIX code (EUC) and ISO10646 code (ISO).

A data storage section 106 is provided in the RAM 13 illustrated in FIG. 2, and has a data area 107. Further, the data storage section 106 stores a conversion table 108 and a conversion program 109. The conversion program 109 is used to convert a character code into image data according to the conversion table.

Figure 14:
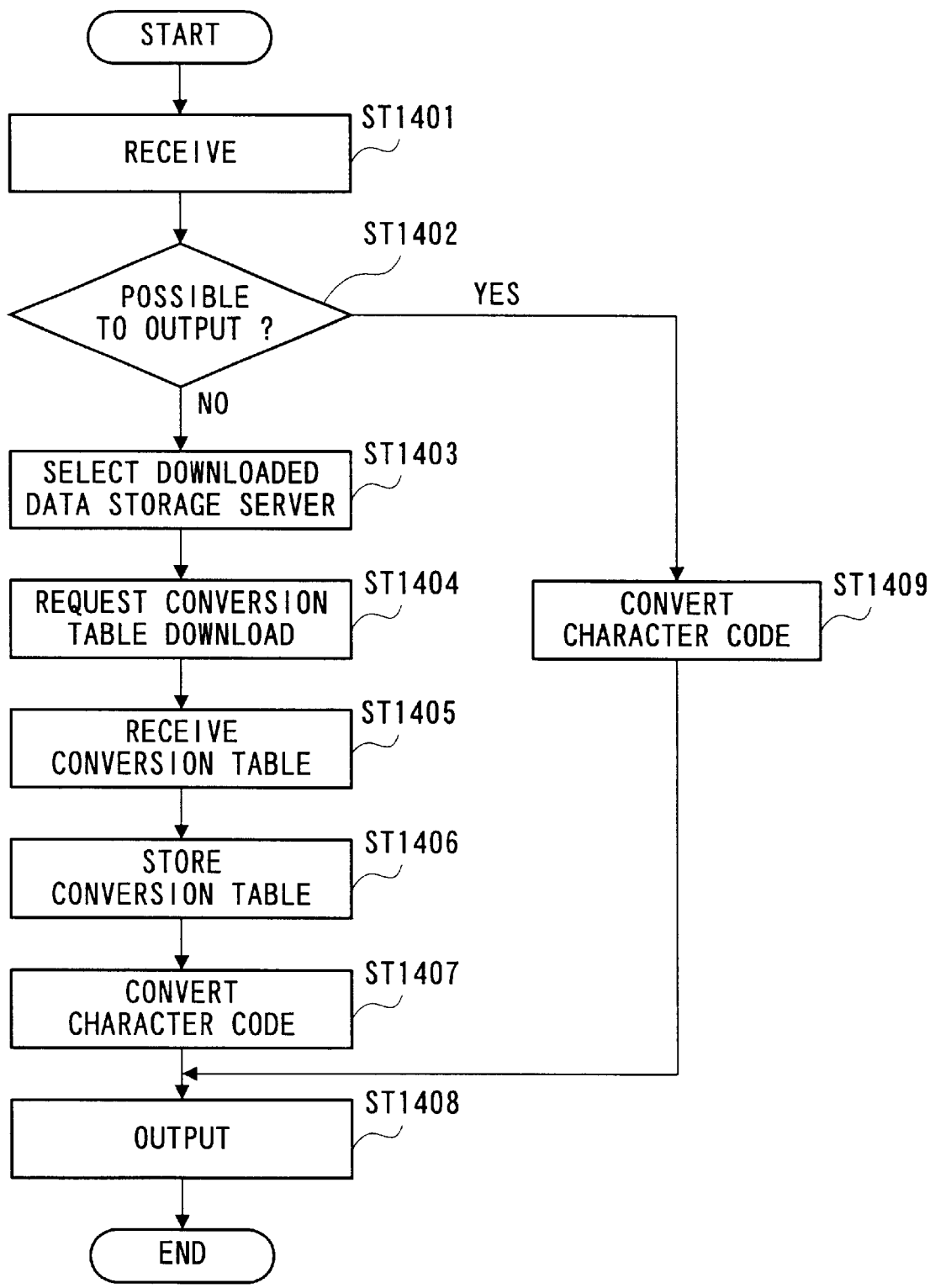
FIG. 14 is a flow diagram illustrating operations of the internet facsimile apparatus according to the above second embodiment.

Operations of the IFAX 100 according to the second embodiment configured as described above are explained with reference to drawings. FIG. 14 is a flow diagram illustrating operations of the internet facsimile apparatus according to the second embodiment.

In ST1401, the mail communication section 41 receives an electronic mail. In ST1402, the attribute decision section 102 reads the character code attribute information 122 included in the electronic mail and decides whether or not it is possible to convert the character code to output by referring to the attribute table 103.

When it is impossible to output, in ST1403, the DL execution section 104 refers to the sever table so as to select the downloaded data storage server 4 having the conversion table to convert the character code of the received electronic mail.

In ST1404, the DL execution section 104 generates the DL request message to transmit to the downloaded data storage server 4 via the mail communication section 41.

In ST1405, the mail communication section 41 receives the data-attached mail to which the conversion table is attached from the downloaded data storage server 4. In ST1406, the DL execution section 104 decodes the conversion table attached to the data-attached mail to store in the data storage section 107.

In ST1407, the program execution section 52 reads out the conversion table from the data storage section 107 and converts the character code of the electronic mail into image data using the conversion table. In ST1408, the converted image data are output. Specifically, the printer 17 illustrated in FIG. 2 prints the image data. In addition, the facsimile control section 15 compresses the image data into facsimile data such as MH data to forward to a facsimile apparatus via the PSTN 16.

When it is possible to output in ST1402, in ST1409, the character code of the electronic mail is converted into image data using the conversion table. In ST1408, the image data are output.

According to the IFAX 100 in the second embodiment described above, it is decided whether or not it is possible to convert a character code of an electronic mail, and when it is not possible, a conversion table is downloaded from the downloaded data storage and the character code is converted using the conversion table. It is thus possible to respond to any character code, thereby allowing all electronic mail to be output. Further, since it is not necessary for the IFAX 100 to comprise all conversion tables, it is possible to make memory capacities of the RAM 13 and the flash memory 14 comparatively low, thereby resulting in a reduction of the product cost.

The above second embodiment describes about the case where a conversion table is downloaded to convert a character code. However, the object to be downloaded is not limited by the case, and the object may be a program for expanding an attached file to convert into image data.
(Third embodiment)

Next, an internet facsimile apparatus for forwarding received electronic mail data to a conversion server in order to enable the data to be converted in the conversion server is explained.

Figure 15:
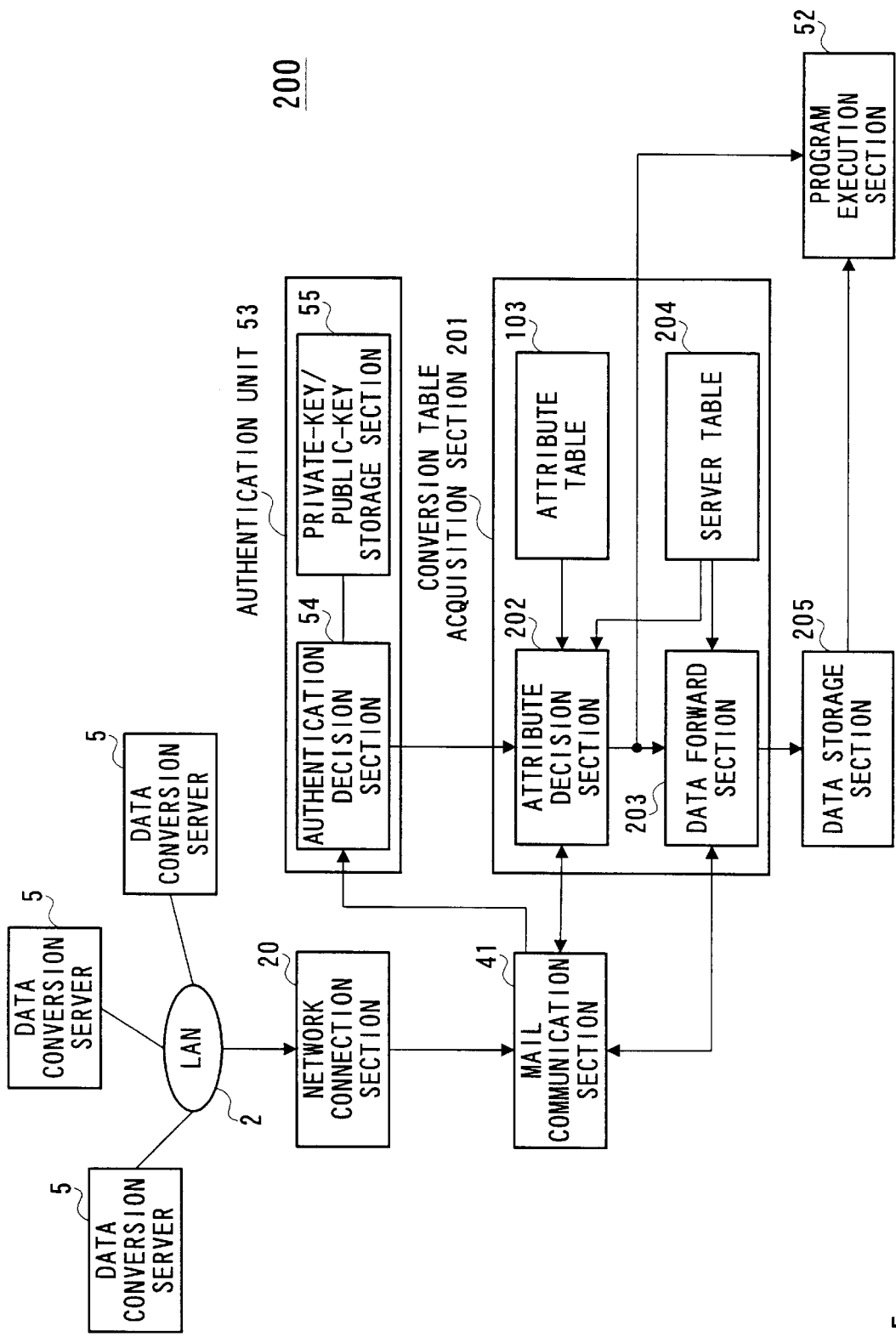
FIG. 15 is a function block diagram illustrating the internet facsimile apparatus according to the third embodiment of the present invention.

FIG. 15 is a function block diagram illustrating the internet facsimile apparatus according to the third embodiment of the present invention. The same configurations as the first embodiment have the same symbols to omit the explanation.

A conversion table acquisition section 201 is composed of an attribute decision section 202, the attribute table 103, a data forward section 203 and a server table 204. The attribute decision section 202 decides whether or not it is possible to convert an attached file of an electronic mail received by the mail communication section 41 to output. The decision is executed according to the attribute table 103 illustrated in FIG. 11. In this example, the attribute is an attached file format that is distinguished by extension such as ".doc" or ".xls".

The attribute decision section 202 obtains the attribute of the attached file using file the attribute information 123 contained in the attribute information area 121 of the electronic mail.

When it is decided that it is possible to convert the attached file, the attribute decision section 102 instructs the program execution section 52 to execute the conversion. On the other hand, when it is not possible to convert, a data forward section forwards the attached file.

The data forward section 203 accesses the data conversion server 5 to forward the attached file so that the conversion server converts the attached file into data that the IFAX 200 can process. The data conversion server 5 transmits an electronic mail to which the converted data are attached (hereinafter referred to as converted data attached mail) to the data forward section 203. The data forward section 203 extracts the converted data from the received converted data attached mail.

In the server table 204, a type of data, an IP address and a mail address of a server for converting the data are set in correlation with each other. FIG. 16 is a diagram illustrating an example of a server table used in the third embodiment. Each IP address and each mail address of a server for processing a conversion are set corresponding to PDP (Portable Document Format) file (.PDF), word processor document (.doc) and spread sheet (.xls).

The data storage section 205 is provided in the RAM 13 and stores an attached file to be converted and converted data.

Figure 17:
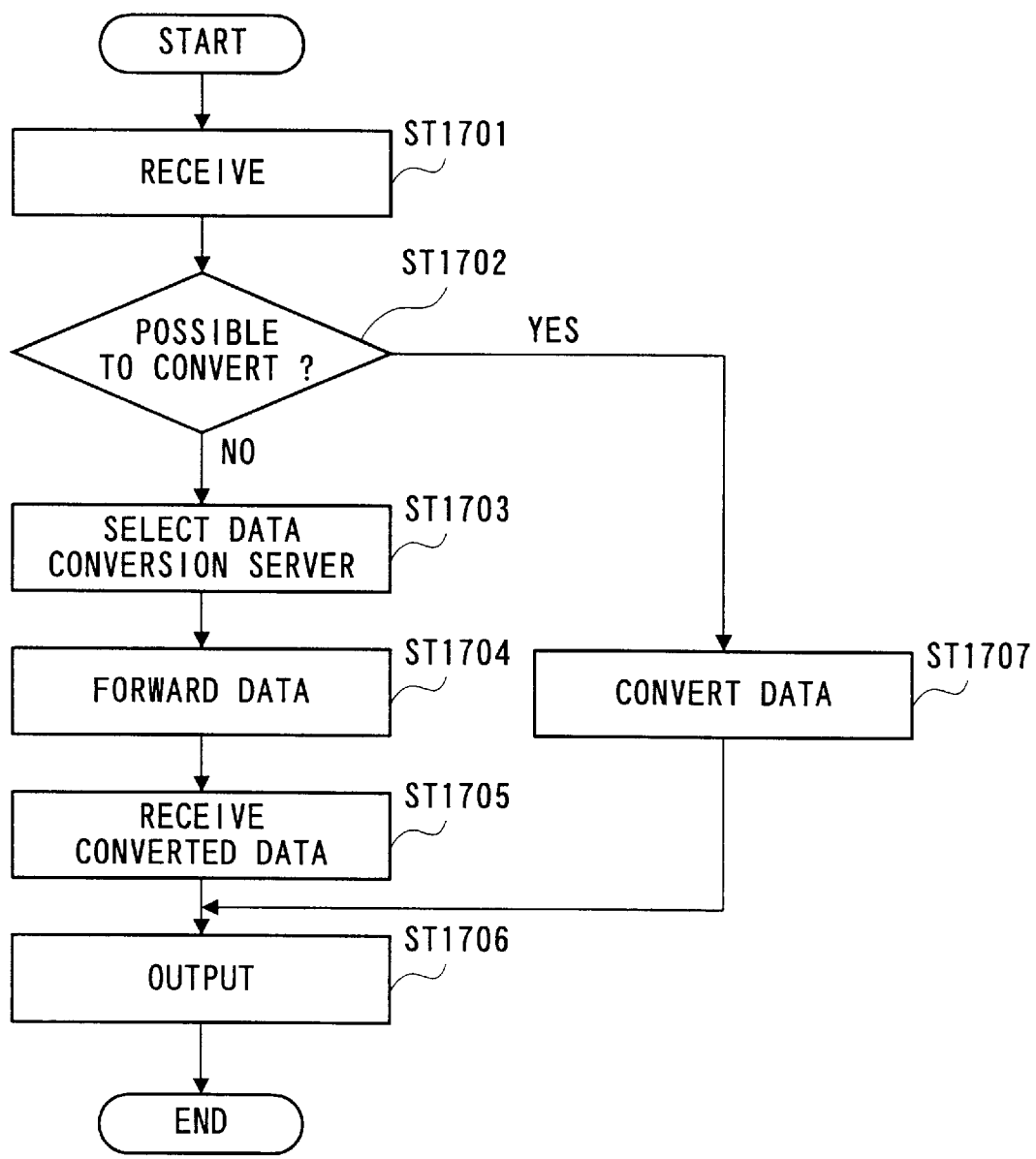
FIG. 17 is a flow diagram illustrating operations of the internet facsimile apparatus according to the above third embodiment.

Operations of the IFAX 200 according to the third embodiment configured as described above are explained with reference to drawings. FIG. 17 is a flow diagram illustrating operations of the internet facsimile apparatus according to the third embodiment.

In ST1701, the mail communication section 41 receives an electronic mail. In ST1702, the attribute decision section 202 reads the file attribute information 123 of the electronic mail and decides whether or not it is possible to convert an attached file to output by referring to the attribute table 103.

When it is impossible to convert, in ST1703, the data forward section 203 selects, by referring to the server table 204, the data conversion server 5 for converting the attached file.

In ST1704, the data forward section 203 generates an electronic mail to which an attached file is attached (hereinafter referred to as forward mail) to transmit to the data conversion server 5 via the mail communication section 41.

In ST1705, the mail communication section 41 receives the converted data attached mail from the data conversion server 5. The data forward section 203 decodes the converted data attached in the converted data attached mail to store in the data storage section 205.

In ST1706, the program execution section 52 reads out the converted data from the data storage section 205 to output. Specifically, the data is printed in the printer 17 illustrated in FIG. 2. In addition, the facsimile control section 15 compresses the converted data into facsimile data to forward to a facsimile apparatus via the PSTN 16.

When it is possible to convert in ST1702, the attached file is converted in ST1707, and output in ST1706.

According to the IFAX 200 in the third embodiment described above, it is decided whether or not it is possible to convert an attached file of an electronic mail, and when it is not possible, the attached file is forwarded to the data conversion server 5 to be converted, then the converted data is received from the data conversion server 5. It is thus possible to respond to any attached file, thereby allowing all electronic mail to be output. Further, since it is not necessary for the IFAX 200 to comprise all conversion programs for attached files, it is possible to make memory capacities of the RAM 13 and the flash memory 14 comparatively low, thereby resulting in a reduction of the product cost.

The above third embodiment describes about the case of forwarding an attached file to a server so that the server converts it. However, an object to be forwarded is not limited by the case. It may be possible to forward text data with a character code that can not be converted to a server so that the server converts them.

The present invention is not limited by the above first embodiment to the third embodiment. For example, an internet facsimile apparatus is explained in the above first embodiment to the third embodiment. However, the present invention is further applicable widely to a communication apparatus such as, for example, a personal computer that is connected to a LAN or an information terminal device with a communication function. However, the present invention is especially effective in electronic equipment comprising communication function without a large capacity second memory device such as an internet facsimile apparatus in view of enabling a response to various attributes of data.

As described above, according to the present invention, in a communication apparatus, it is possible to easily rewrite various types of data such as a program to new one and to process various types of data.

The present invention is not limited to the above described embodiments, and various variations and modifications may be possible without departing from the scope of the present invention.

This application is based on the Japanese Patent Application No.HEI10-194663 filed on Jul. 9, 1998, entire content of which is expressly incorporated by reference herein.

What is claimed is:

1. A communication apparatus that receives program data downloaded from a server, comprising:
   a mail reception section that receives an instructing electronic mail including a download instruction via a network, the instructing electronic mail not including the program data;
   an indication section that indicates reception of the instructing electronic mail when the instructing electronic mail including the download instruction is received by said mail reception section;
   an input section that instructs downloading of the program data in response to operation by an operator; and
   a download section that transmits a download request message to the server in accordance with the instruction by said input section, receives a program electronic mail, having the program data attached, from the server, in response to the download request message, and extracts the program data from the program electronic mail.

2. The communication apparatus according to claim 1, further comprising a memory that stores the extracted program data.

3. The communication apparatus according to claim 1, wherein said input section comprises a button exclusively used for the instructing download of the program data.

4. The communication apparatus according to claim 1, further comprising an authentication section that authenticates a sender of a received electronic mail, and said download section transmits the download request message to the server when said authentication section determines that the sender is authentic.

5. The communication apparatus according to claim 1, further comprising a further indication section that indicates a type of the downloaded program data, based on the download instruction.

6. The communication apparatus according to claim 5, wherein the type of the downloaded program data indicates at least basic program and additional program.

7. The communication apparatus according to claim 1, further comprising a printer that prints a type of the downloaded program data, based on the download instruction.

8. The communication apparatus according to claim 1, further comprising a scanner that accepts image data; and
   a facsimile section that transmits the image data to a destination.

9. A communication apparatus that receives a conversion table downloaded from a server, comprising:
   a mail reception section that receives an instructing electronic mail including a download instruction via a network, the electronic mail not including the conversion table;
   an indication section that indicates reception of the instructing electronic mail when the instructing electronic mail including the download instruction is received by said mail reception section;
   an input section that instructs downloading of the conversion table in response to operation by an operator; and
   a download section that transmits a download request message to the server in accordance with the instruction by said input section, receives a program electronic mail, having the conversion table attached from the server, in response to the download request message, and extracts the conversion table from the electronic mail.

10. A data download method for receiving program data downloaded from a server, comprising:
   receiving an instructing electronic mail including a download instruction via a network, the instructing electronic mail not including the program data;
   indicating reception of the instructing electronic mail when the instructing electronic mail including the download instruction is received;
   instructing download of the program data in response to an operation by an operator;
   transmitting a download request message to the server in accordance with the instruction in response to the operation by the operator,
   receiving a program electronic mail having the program data attached, which is transmitted from the server, in response to the download request message; and
   extracting the program data from the program electronic mail.

11. A data download method for receiving a conversion table downloaded from a server, comprising:

receiving an instructing electronic mail including a download instruction via a network, the instructing electronic mail not including the conversion table;

indicating reception of the instructing electronic mail when the instructing electronic mail including the download instruction is received;

instructing download of the conversion table in response to operation by an operator;

transmitting a download request message to the server in accordance with the instruction in response to the operation by the operator, receiving a program electronic mail having the conversion table attached, which is transmitted from the server, in response to the download request message; and extracting the conversion table from the program electronic mail.

* * * * *